UNITED STATES PATENT OFFICE.

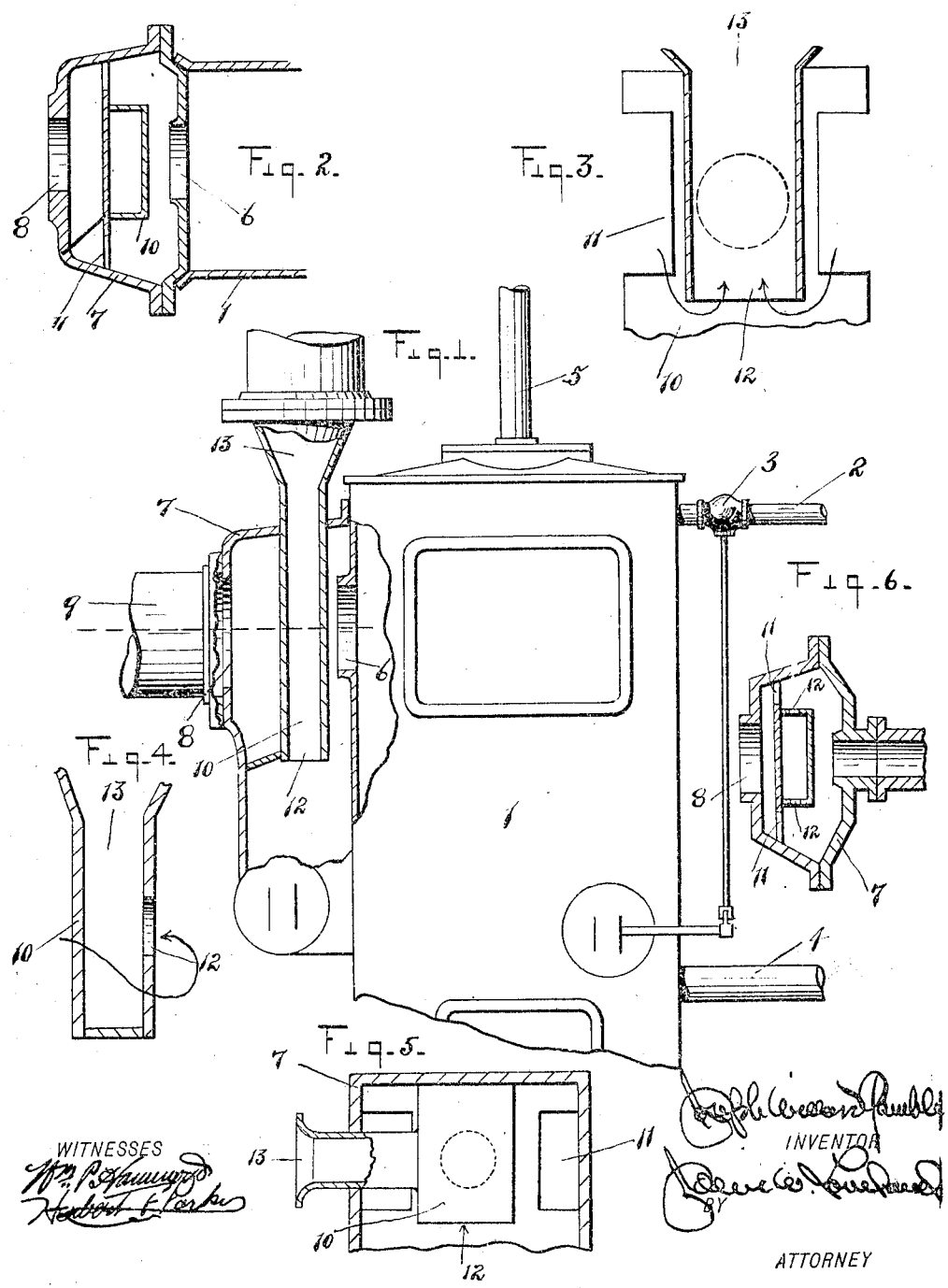

JOSEPH WILLARD GAMBLE, OF PHILADELPHIA, PENNSYLVANIA.

SEPARATOR.

No. 926,107.  Specification of Letters Patent.  Patented June 29, 1909.

Application filed May 6, 1908. Serial No. 431,270.

*To all whom it may concern:*

Be it known that I, JOSEPH WILLARD GAMBLE, a citizen of the United States, and a resident of and whose post-office address is No. 3251 North Sixteenth street, city of Philadelphia, Pennsylvania, have invented certain new and useful Improvements in Separators, of which the following, taken in connection with the accompanying drawing, is a concise and complete description thereof.

My invention has for its object the production of a separator of improved form which is capable of effecting complete separation of the liquids and solids from the exhaust steam passing therethrough, and at the same time provide an alternative or auxiliary passage for the steam to a heating system or other place of installation when it is desired to divert the steam from its usual and primary course straight through the separator and around the baffle to the aforesaid other place of installation. This form of separator requires the steam to take a roundabout or circuitous path before the same can be carried off through the hollow baffle to the heating system or other place of installation. By reason of this circuitous passage, a more complete treatment within the separator and a consequent higher degree of separation efficiency are obtained.

Referring to the accompanying drawings in which like reference numerals indicate like parts throughout the several views, Figure 1 represents a heater to which is attached a separator of my improved construction, partly in section, to show the construction thereof. Fig. 2 is a top plan sectional view of a modified form thereof. Fig. 3 is a front view partly in section showing the side ports or openings in the baffle plate forming the front or impact side of the hollow baffle. Fig. 4 is a modified form of the hollow baffle. Fig. 5 is a modified form showing outlet at side of separator. Fig. 6 is a modified form showing openings in sides of hollow baffle.

Referring to the drawings in detail, —1— represents a feed water heater of the well known open type having a raw water supply inlet —2— controlled by the usual float actuated valve —3—.

4— represents the outlet to the feed pumps.

5— indicates a vent or exhaust from the heater to the atmosphere.

6— represents the exhaust steam inlet to the heater. Attached to the heater, as shown in Fig. 2, or formed integral therewith, as shown in Fig. 1, is the separator —7—. The separator —7— is provided with an exhaust steam inlet —8— to which is attached an exhaust steam inlet pipe —9— through which is supplied the exhaust steam to the heater —1—. Intermediate the inlets —6— and —8— is arranged a hollow baffle —10— the passageway therethrough leading from the interior of the separator to an exhaust steam heating system or other similar point or points of use. This baffle is provided with side openings or ports —11— (see Figs. 2, 3, 5, and 6) through which the exhaust steam passes to the heater or the heating system described. The hollow baffle —10— is provided with an inlet opening —12— which preferably is arranged at the lower extremity thereof but may advantageously be provided at any point along the inner wall, as at the back, (see Fig. 4) or at the sides (see Fig. 6) of the separator, if found desirable. It is apparent that a valve may be employed to control the inlet opening —6— to the heater to regulate the admission of the exhaust steam therto, and also regulate the quantity of the exhaust steam that passes up through the hollow baffle plate to the heating system or other point of use. As such a cut out valve is the subject matter of a companion case, I do not more fully describe or illustrate the same.

It will be evident that if the passage of steam through the heater, or outlet —6— is prevented in whole or in part for any reason or by any means, it will be diverted through the hollow baffle —10— through the opening —12— either at bottom of baffle as in Figs. —1— —2— —3— —5—, back of baffle as in Fig. 4, or side of same, as in Fig. 6, and thence through the passage —13— to the other point of use.

While I have shown my improved separator as forming a part of or attached to a heater, it will be understood that I do not limit myself to that combination, as my separator may be used either conjointly with a heater or other device into which the steam normally passes directly from the separator, or it may be used separate and apart from any particular device, being connected by a conduit or pipe as shown in Fig. 6. Moreover, the alternative or auxiliary outlet —13— may be above the baffle as in Fig. 1, or at the side, as in Fig. 5, the location not being limited.

I do not wish to be limited to the precise details of construction as disclosed, since the same may be departed from and still come within the scope and tenor of my claims. It is manifest that I do not necessarily need to employ a hollow baffle of the precise structure shown, but may, if I so desire, employ a baffle of a different type, and have the auxiliary outlet from before or beyond the said baffle, as my invention broadly comprehends a combined heater and separator having a baffle and an auxiliary outlet.

Having thus described my invention, what I claim herein and desire to protect by Letters Patent is,

1. A separator provided with an inlet and an outlet; and a baffle, having an auxiliary steam passageway therethrough.

2. A separator having an inlet aperture and an outlet aperture; a hollow baffle intermediate the two having a steam passageway leading from the separator therethrough, substantially as described.

3. A combination of a heater and separator having a centrally vertically arranged hollow baffle, having a steam passageway leading from the separator therethrough.

4. The combination of a feed water heater; a separator having an exhaust steam inlet, an outlet to the heater, and an auxiliary outlet; a hollow baffle in the separator having a steam passageway therethrough to the auxiliary outlet.

5. A separator provided with a hollow baffle, said baffle having a passageway around the same; an inner steam inlet and a steam outlet therefrom, substantially as described.

6. A separator having an inlet and an outlet; a hollow baffle provided with a steam passageway having an auxiliary outlet.

7. A separator having an inlet and an outlet; a hollow baffle; a steam passageway therethrough having an auxiliary outlet; said baffle provided with a rear opening communicating with said auxiliary outlet.

8. A separator having a hollow baffle interposed between an oppositely disposed inlet and outlet; a steam passageway within said baffle, leading to an auxiliary outlet.

9. A combined feed water heater and separator having a horizontal steam inlet and horizontal and vertical steam outlets and a baffle intermediate the inlet and outlets substantially as described.

10. A combined feed water heater and separator, a baffle within said separator and an auxiliary steam outlet from that part of the separator which is beyond the baffle, substantially as described.

11. A combined feed water heater and separator, a baffle in said separator and a horizontal steam auxiliary outlet from the part of the separator which is beyond the baffle, substantially as described.

12. A separator having an inlet and an outlet, and a baffle intermediate said inlet and outlet, having an auxiliary steam outlet therethrough.

13. A separator provided with a steam inlet and outlet; a hollow baffle; a steam passage around said baffle; a steam inlet to the interior of said baffle, and a steam outlet from said baffle.

14. A separator provided with a steam inlet and outlet; a hollow baffle; a steam inlet to the interior of the baffle, and an auxiliary steam outlet therefrom.

15. A separator provided with a steam inlet and outlet; a hollow baffle; a steam passageway around said baffle; a steam inlet to the interior of said baffle; and an auxiliary steam outlet therefrom.

16. A separator having an inlet and an outlet; and a hollow baffle provided with a rear inlet and an outlet for the passage of steam.

17. The combination of a heater and a separator, said separator being provided with a steam inlet and outlet; a hollow baffle; a steam inlet to the interior of said baffle; and an auxiliary steam outlet therefrom.

18. The combination of a heater and a separator, said separator being provided with a steam inlet and outlet; a hollow baffle; a steam passage around said baffle; a steam inlet to the interior of said baffle, and a steam outlet therefrom.

19. The combination of a heater and a separator, said separator having a steam inlet and an auxiliary steam outlet; a hollow baffle intermediate said inlet and outlet; a steam passageway around said baffle; a steam inlet to the interior of said baffle leading to said auxiliary outlet.

20. The combination of a heater and a separator, said separator being provided with an inlet and outlet; a vertically arranged hollow baffle provided with a rear inlet and outlet for the passage of steam.

21. The combination of a heater; a separator, having a steam inlet and a steam outlet to the heater; a baffle in said separator; and an auxiliary steam outlet from said separator.

22. A unitary structure comprising a heater and a separator provided with a baffle; another point of use for exhaust steam; an auxiliary outlet from said separator to said other point of use.

JOSEPH WILLARD GAMBLE.

Witnesses:
Wm. P. Hammond,
John W. Loveland.